United States Patent Office 3,773,839
Patented Nov. 20, 1973

3,773,839
ADDITION OF HYDROCARBON SULFENYL HALIDES TO OLEFINS
Wolfgang H. Mueller, Elizabeth, Alexis A. Oswald, Mountainside, and Daniel N. Hall, Linden, N.J., assignors to Esso Research and Engineering Company
No Drawing. Continuation of application Ser. No. 836,127, June 24, 1969, which is a continuation-in-part of application Ser. No. 595,559, Oct. 28, 1966, both now abandoned. This application Aug. 30, 1971, Ser. No. 176,239
U.S. Cl. 260—609 R        6 Claims

ABSTRACT OF THE DISCLOSURE

Anti-Markownikov addition products and 1,2-Markownikov oriented products are secured through the reaction of sulfenyl halides, preferably sulfenyl chlorides, with olefins in the presence of non-reactive, non-nucleophilic base materials. The 1,2-Markownikov oriented adducts are the principal products when conjugated diolefins are employed as the starting feedstock. Anti-Markownikov adducts are obtained when unsymmetrical monoolefins and multiolefins are used as the starting material. Preferably, the addition reactions are conducted at temperatures below about 0° C.

CROSS-REFERENCE TO RELATED APPLICATION

This is a continuation of application Ser. No. 836,127, filed June 24, 1969, which in turn is a continuation-in-part of application Ser. No. 595,559, filed Oct. 28, 1966, both now abandoned.

BACKGROUND OF THE INVENTION

(I) Field of the invention

This invention relates to sulfenyl halide additions to unsaturated hydrocarbons. More particularly, this invention concerns addition products and a process for producing anti-Markownikov products of olefins and diolefins and 1,2-Markownikov oriented products of conjugated dienes which are of particular interest as pesticides and as intermediates in the synthesis of pesticides.

DESCRIPTION OF THE PRIOR ART

In accordance with Markownikov's rule, in the addition reaction of two organic molecules, the least hydrogenated carbon atom of one will combine with the most negative element of the other. Therefore, as disclosed by N. Kharasch, Sulfenium Ions and Sulfenyl Compounds, in "Organic Sulfur Compounds," vol. 1, 1961, pp. 375–396, the reaction between an olefin and a sulfenyl chloride affords Markownikov-oriented products according to the following equation:

$$CH_2=CHR + R'SCl \longrightarrow R'SCH_2\overset{\underset{\mid}{Cl}}{C}HR$$

SUMMARY OF THE INVENTION

It has now been discovered that anti-Markownikov oriented adducts are formed in high selectivity when such a reaction is carried out in the presence of a small amount of a base. Thus, in accordance with this invention, the reaction between an olefin and a sulfenyl chloride in the presence of a base proceeds as follows:

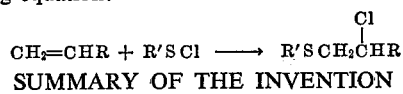

The reaction occurs instantaneously and quantitatively at a temperature of from −100° to about +100° C., preferably below 0° C. For the reaction of most olefins with a sulfenyl halide, a small amount of a base, such as an alkali or alkaline earth metal carbonate, has to be present to inhibit the acid catalyzed rearrangement of the anti-Markownikov oriented adducts to the corresponding Markownikov products. It was also discovered that if a conjugated diene is reacted with a sulfenyl halide, the 1,2-Markownikov oriented adduct is produced. The use of the base, in this latter case, stabilizes the adduct produced from the conjugated diene by preventing any subsequent allylic rearrangement to the corresponding 1,4-adducts.

The adducts of this invention have utility as pesticides and as intermediates in pesticide synthesis. The anti-Markownikov oriented adducts are particularly interesting as intermediates in pesticide synthesis; for, in contrast to earlier reported Markownikow oriented adducts, they undergo facile $SN_2$ displacement reactions. For example, thiophosphate pesticides can be prepared as follows:

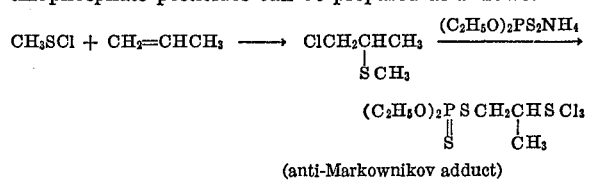

(anti-Markownikov adduct)

The diene monoadducts can be similarly applied. Moreover, the diene monoadducts represent intermediates for a new class of substituted dienes. For example, if a sulfenyl chloride is added to butadiene, the following substituted dienyl compounds are produced:

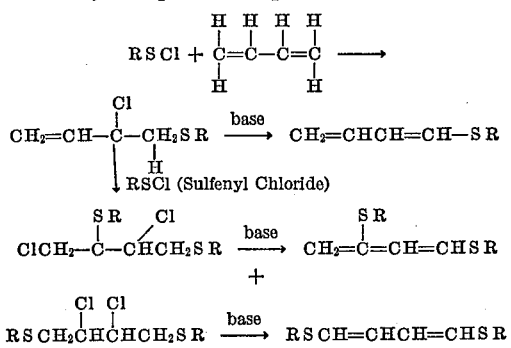

These substituted butadienes are of interest as comonomers. Moreover, they have higher reactivity than simple dienes and will therefore permit chemistry otherwise not possible or possible only under extreme reaction conditions.

The sulfenyl halide materials that are employed in the reaction with unsaturated organic compounds in accordance with the present invention have the following general formula:

RSX wherein R is a monovalent, substituted or unsubstituted, hydrocarbyl radical having from 1 to 30 carbon atoms, preferably (a) a $C_1$ to $C_{30}$, more preferably a $C_1$ to $C_{14}$, and most preferably a $C_1$ to $C_6$ alkyl radical, for example, methyl, propyl, t-butyl, cyclohexyl, 4-ethyl-dodecyl, 3-butoxyheptyl, 4-chlorohexyl, decyl, 2-t-butyl-4-propyl-thiononyldecane, etc.; (b) $C_6$ to $C_{16}$ aryl radicals, e.g., phenyl, etc.; (c) $C_7$ to $C_{30}$, preferably $C_7$–$C_{16}$ alkylaryl radicals, for example, tolyl, diethylphenyl, diethyl-naphthyl, nonylphenyl, etc.; (d) $C_7$ to $C_{30}$, preferably $C_7$–$C_{16}$ aralkyl radicals, for example, benzyl, phenylethyl, dibutylbenzyl, etc.; and (e) their halo, particularly chloro and bromo, alkylthio-(radicals having from 1 to 10 carbon atoms), alkoxy-(radicals having from 1 to 10 carbon atoms), acyl- and carboalkoxy-(radicals having from 1 to 10 carbon atoms) substituted derivatives; X is a halogen atom, e.g., chlorine or bromine atoms, preferably a chlorine atom.

Representative, non-limiting examples of useful sulfenyl halide reagents include propanesulfenyl chloride, dodecanesulfenyl chloride, 5-bromopentanesulfenyl chloride, cyclohexylsulfenyl chloride, phenylethylsulfenyl bromide, methoxybenzenesulfenyl chloride, naphthalenesulfenyl chloride, benzothiazolesulfenyl chloride, thiophenesulfenyl chloride, isopropanesulfenyl chloride, methylthioethanesulfenyl chloride, t-butylsulfenyl chloride, methylsulfonylethanesulfenyl chloride, xylenesulfenyl chloride, hexadecylbenzenesulfenyl bromide, butoxyethanesulfenyl chloride, acetylbenzenesulfenyl chloride, carbododecyloxycyclohexanesulfenyl chloride, fluorohexanesulfenyl bromide, etc.

The unsaturated hydrocarbons employed in preparing the compositions of the present invention are, in general, $C_3$ to $C_{50}$ hydrocarbons containing at least one non-aromatic ethylenic double bond and analogs thereof. Preferably, the unsaturated hydrocarbons are (a) $C_3-C_{50}$, more preferably $C_3-C_{30}$, and most preferably $C_3-C_{14}$ acylic unsymmetrical monoolefins, that is, terminal olefins or internal olefins wherein the carbon atoms having the ethylenic site of unsaturation contain differing numbers of hydrogen atoms, for example, propylene, isobutylene, 1-butylene, 1-dodecane, triacontene, 1-hexene, 6-methylthiohexene-1, 8-carboethoxyoctene-1, 12-chlorododecene-1, etc.; (b) $C_4-C_{14}$ conjugated and nonconjugated acyclic aliphatic multiolefins, preferably diolefins, e.g., 1,5-hexadiene, 1,6-octadiene, trivinylcyclohexane, butadiene, isoprene, chloroprene, cyanoprene, piperylene, fluoroprene, 2,5 - dimethyl - 2,4-hexadiene, dimethylbutadiene, etc.; (c) $C_3-C_{12}$ unsymmetrical alicyclic aliphatic monoolefins, for example, 1-methylcyclopentene, 1-ethylcyclooctene, 1-butylcycloheptene, etc.; (d) $C_5-C_{12}$ cyclic aliphatic diolefins, such as 1-methylcyclododecadiene-1,5, cyclododecadiene - 1,3, 1 - ethylcyclooctadiene-1,4 cyclopentadiene, methylcylopentadiene, dimethyldicyclopentadiene, etc.; (e) $C_9-C_{16}$ alkenyl substituted aromatics, said alkenyl substitution preferably having the site of unsaturation located on the terminal carbon atom and having from 3 to 10 carbon atoms, such as allyl benzene, 5-phenylhexene-1, allylnaphthylene, etc.; (f) halogen, preferably chlorine, substituted derivatives thereof. Most preferably, the unsaturated hydrocarbons are terminal monoolefins or $C_4-C_{10}$ conjugated alicyclic and acylic diolefins. The unsaturated organic compounds may have straight, branched or cyclic chains. Moreover, the carbon chains may be substituted or unsubstituted; however, it is generally preferred that they be unsubstituted. Conjugated acylic dienes, such as butadiene and chloroprene, are of particular interest because new products are formed therefrom which have higher reactivity than those of simple dienes. The preferred olefinic feedstocks have from 3 to 6 carbon atoms.

A base is required to isolate and/or stabilize the adducts. Suitable bases include alkali or alkaline earth metal (Groups I-A and II-A of the Periodic Table) carbonates and oxides, e.g., sodium carbonate, lithium carbonate, magnesium oxide, calcium carbonate, potassium oxide, etc., zinc and cadmium carbonates and oxides, and $C_3-C_{30}$, preferably $C_3-C_{12}$ tertiary trihydrocarbyl amines, such as trimethylamine, tribenzylamine, trimethylaniline, pyridine, quinoline, N,N-dimethyl piperazine, triethylene diamine, etc. In general, any organic or inorganic base which does not act as a nucleophile or react with the sulfenyl chloride may be employed. Useful bases are materials which selectively act as hydrogen halide acceptors. The non-nucleophilic, non-reactive (towards the olefin and sulfenyl halide reagents) base may be dissolved in the liquid reaction mixture or suspended in the reaction mixture as a solid.

The reaction occurs at a temperature of from $-100°$ C. to $+100°$ C., preferably below $0°$ C.; the pressure of the reaction should be maintained at from 5 p.s.i.a. to 140 p.s.i.a., preferably at atmospheric pressure. In the addition reaction between a sulfenylhalide and a monoolefin, the reactants should be present in a mole ratio of sulfenyl halide to unsaturate from 5:1 to 1:10, preferably from 1.1:1 to 1:1.1. If a diolefin or multiolefin is employed, for example, a conjugated diene such as butadiene, a 2-10 fold, preferably 2-5 fold, excess of the unsaturate should be employed. Preferably, the reactants are brought together in the liquid state.

If liquid unsaturates are utilized, the sulfenyl halide may be added slowly, preferably dropwise, to an excess of unsaturate containing a small amount of base to control the temperature. The reaction temperature is preferably maintained at lower than $0°$ C. for a period of from 0.1 to 5 hours. After the reaction is complete, the mixture is brought slowly to room temperature and the excess unsaturate and solvent are removed under reduced pressure. The crude product may be distilled under high vacuum and low temperatures.

Sulfenyl halides may be reacted with gaseous unsaturates by bubling the gas through the sulfenyl halide. It has been discovered, however, that better yields are obtained if the sulfeny halide is dropped slowly into a solution of the gaseous unsaturate in a suitable solvent such as methylene chloride, carbon tetrachloride, chloroform, ethyl ether, hydrocarbons or the like. If either gaseous or liquid unsaturates are used, the volume ratio of solvent to reactants normally ranges from 0.5 to 20, preferably 1 to 10.

In the reactions of this invention, a base should be employed in an amount sufficient (generally at least about 0.001 wt. percent based on reactants) to isolate and/or stabilize the anti-Markownikov and 1,2-Markownikov oriented aducts. In the reactions involving monolefins, liquid or gaseous, the base should be present in a concentration of from 0.001 to 5 wt. percent, based on reactants. If a diolefin is employed, the base should be utilized in a concentration of from 0.001 to 5 wt. percent, preferably 0.01 to 1 wt. percent, based on reactants, in order to prevent subsequent allylic rearrangement to a 1,4 oriented product.

The novel compositions of this invention include aliphatic and aromatic sulfenyl halide adducts of open chain conjugated dienes having the following general formulae:

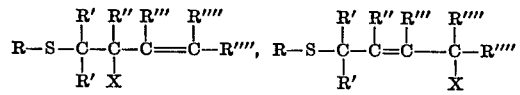

wherein R and X are as defined above and R', R'', R''', and R'''' are the residues of the open chain olefin remaining after reaction with the sulfenyl halide material. In general, R', R'', R''' and R'''' represent hydrogen atoms, halogen atoms, e.g., chloro and bromo atoms, and lower alkyl radicals. When one or more of R', R'', R''' and R'''' represent lower alkyl radicals, the sum of the carbon atoms of the alkyl chains should not exceed about 10 carbon atoms, preferably should not exceed about 6 carbon atoms.

Anti-Markownikov adducts are produced by the addition of aliphatic or aromatic sulfenyl halides to terminal or alpha olefins. Such adducts have the following general formula:

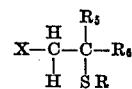

wherein R and X are as defined and $R_5$ and $R_6$ are the hydrocarbon residues of the starting terminal monoolefin, alicyclic monoolefin or alkenyl substituted aromatic compound. In particular, $R_5$ is a $C_1-C_{28}$, preferably a $C_1-C_{12}$ monovalent alkyl radical, or a $C_1-C_{10}$ divalent alkyl radical or a $C_7-C_{13}$ aralkyl radical (the residue from the terminally unsaturated alkenyl substituted aromatic compound). $R_6$ is a monovalent or divalent radical as in $R_5$ or a hydrogen radical. Anti-Markownikov oriented and 1,2-Markownikov oriented adducts are normally the predominant (greater than 50 mole percent) products of the individual reactions.

The invention is illustrated by the following examples.

EXAMPLE I

Methanesulfenyl chloride was added dropwise to a 50% solution of $CH_2=CHCH_3$ in $CH_2Cl_2$ with a small amount, 0.5–1 wt. percent based on total $CH_2Cl_2$-propylene solution, anhydrous (solid) $CaCO_3$ suspended in it. A 3-neck flask fitted with a thermometer, a condenser with nitrogen purge, an addition funnel and a magnetic stirrer was used for the reaction. The propylene and methanesulfenyl chloride were employed in equimolar amounts. The reaction mixture was maintained at −75° C. The reaction occurred instantaneously and substantially quantitatively. Upon completion of the reaction, the solvent was removed at 0°/15 mm. and the crude product was analyzed by N.M.R. spectroscopy. The sample was further purified by distillation under reduced pressure, and was then reanalyzed. As is seen in Table I, the anti-Markownikov oriented adduct was produced in a high proportion.

EXAMPLE II

Methanesulfenyl chloride was reacted with $$CH_2=C(CH_3)_2$$

(isobutylene) as described in Example I. The reaction temperature, however, was maintained at −20°/C. As shown in Table I, a high proportion of the anti-Markownikov oriented adduct was produced.

EXAMPLE III

Equimolar amounts of methanesulfenyl chloride and $CH_2=CHCH(CH_3)_2$ (3-methyl butylene) were reacted at a temperature of −20° C. in accordance with the process described in Example I. The results summarized in Table I demonstrate that a high proportion anti-Markownikov adduct was produced.

EXAMPLE IV

Methanesulfenyl chloride was reacted with $$CH_2=CHC(CH_3)_3$$

(3,3-dimethylbutene) in accordance with the reaction conditions described in Example III. A high proportion of anti-Markownikov oriented adduct was obtained. See Table I.

EXAMPLE V

Methanesulfenyl chloride was reacted with $$CH_2=CHCH=CH_2$$

(butadiene) at a temperature of −20° C. The reaction conditions and equipment were the same as those employed in Example I except that a 4-fold excess of butadiene was employed to assure a high yield of monoadducts. A high proportion of 1,2-adduct with Markownikov orientation was obtained. See Table I.

EXAMPLE VI

As shown in Table I, a high proportion of Markownikov oriented 1,2-adduct was obtained by reacting $CH_3SCl$ with a 4-fold excess of $CH_2=CHCH-CHCH_3$ under the conditions recited in Example V.

EXAMPLE VII

Methanesulfenyl chloride was reacted with isoprene in accordance with the reaction of Example V. A major proportion of

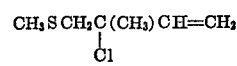

together with

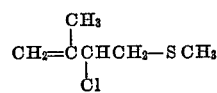

was produced.

EXAMPLE VIII

Benzenesulfenyl chloride and propylene were reacted in equimolar amounts under conditions described in Example I. Seventy percent of the product was the anti-Markownikov oriented product as shown in row II of Table I.

EXAMPLE IX

Benzenesulfenyl chloride was reacted with 3-methylbutene under conditions described in Example III. The product comprised 87% of the anti-Markownikov oriented adduct.

EXAMPLE X

Benzenesulfenyl chloride was reacted with a 4-fold excess of butadiene under conditions described in Example V. 98% of the purified product was the Markownikov oriented 1,2-adduct.

EXAMPLE XI

Methanesulfenyl chloride was reacted with a four-fold molar excess of chloroprene in the manner described in Example V to yield 85 mole percent of the corresponding 1,2-monoadduct.

TABLE I.—METHANE- AND BENZENESULFENYL CHLORIDE-UNSATURATE MONOADDUCTS AND SOME OF THEIR PHYSICAL-ANALYTICAL DATA

| Unsaturate | Sulfenyl chloride | Selectivity for adduct I:II | Adduct-structure [a] I | II | B.P. uncorr., °C. (mm.) | Summary formula |
|---|---|---|---|---|---|---|
| $CH_2=CHCH_3$ | $CH_3SCl$ | 85:15 | $ClCH_2\overset{CH_3}{\underset{}{C}}HSCH_3$ | $CH_3SCH_2\overset{CH_3}{\underset{}{C}}HCl$ | 58–60 (25) | $C_4H_9SCl$ |
| | $C_6H_5SCl$ | 70:30 | $ClCH_2\overset{CH_3}{\underset{}{C}}HSC_6H_5$ | $C_6H_5SCH_2\overset{CH_3}{\underset{}{C}}HCl$ | 128–129 (10) | $C_9H_{11}SCl$ |
| $CH_2=C(CH_3)_2$ | $CH_3SCl$ | 80:20 | $ClCH_2C(CH_3)_2SCH_3$ | $CH_3SCH_2C(CH_3)_2Cl$ | 68 (27) | $C_5H_{11}SCl$ |
| $CH_2=CHCH(CH_3)_2$ | $CH_3SCl$ | 94:6 | $ClCH_2CH(SCH_3)CH(CH_3)_2$ | $CH_3SCH_2CH(Cl)CH(CH_3)_2$ | 72–73 (17) | $C_6H_{13}SCl$ |
| | $C_6H_5SCl$ | 87:13 | $ClCH_2CH(SC_6H_5)CH(CH_3)_2$ | $C_6H_5SCH_2CH(Cl)CH(CH_3)_2$ | 62–64 (0.002) | $C_{11}H_{15}SCl$ |
| $CH_2=CHC(CH_3)_3$ | $CH_3SCl$ | 95:5 | $ClCH_2CH(SCH_3)C(CH_3)_3$ | $CH_3SCH_2CH(Cl)C(CH_3)_3$ | 78 (12) | $C_7H_{15}SCl$ |
| $CH_2=CHCH=CH_2$ | $CH_3SCl$ | 93:7 | $CH_3SCH_2\overset{Cl}{\underset{}{C}}HCH=CH_2$ | $ClCH_2\overset{SCH_3}{\underset{}{C}}HCH=CH_2$ | 60 (13) | $C_5H_9SCl$ |
| | $C_6H_5SCl$ | 98:2 | $C_6H_5SCH_2\overset{Cl}{\underset{}{C}}HCH=CH_2$ | $ClCH_2\overset{SC_6H_5}{\underset{}{C}}HCH=CH_2$ | 81–82 (0.25) | $C_{10}H_{11}SCl$ |
| $CH_2=CHCH=CHCH_3$ | $CH_3SCl$ | 86:14 | $CH_3SCH_2\overset{Cl}{\underset{}{C}}HCH=CHCH_3$ | $CH_3=CH\overset{Cl}{\underset{}{C}}HCH(SCH_3)CH_3$ | 81–82 (14) | $C_6H_{11}SCl$ |
| $CH_2=\overset{}{\underset{CH_3}{C}}CH=CH_2$ | $CH_3SCl$ | 57:43 | $CH_3SCH_2C(CH_3)-CH=CH_2$ with Cl | $CH_2=C-CHCH_2SMe$ with $CH_3$ Cl | 68–69 (15) | $C_6H_{11}SCl$ |
| $CH_2=C(Cl)CH=CH_2$ | $CH_3SCl$ | 85:15 | $CH_3SCH_2CH(Cl)C(Cl)=CH_2$ | $ClCH_2CH(SCH_3)CCl=CH_2$ | 76–76.5 (7) | $C_5H_8SCl_2$ |

[a] Isomer distribution and structure assignment are based on N.M.R. analysis.

EXAMPLE XII

An adduct of methanesulfenyl chloride and butadiene was tested as a nematocide. Meloidiglyme species, nematodes were reared in tomato plant-soil medium. The soil for the test purposes was inoculated with the infected soil and root knots. In the test, a 3-milliliter acetone solution of the methanesulfenyl chloride/butadiene adduct was injected into the soil and ball-milled for five minutes and then held for an additional 2 days before plotting and planting of tomato plants. One pint paper pots were used for each treatment with one tomato transplant per pot. After 3–4 weeks of artificial light and overhead irrigation, the roots of the plants were examined to determine the degree of root knot formation. Inoculated controls normally had about 50–100 root knots per plant. Percent control was determined by comparison of the root knots of treated and untreated tomato plants. In the tests, the adduct $$CH_3S-CH_2CH(Cl)CH=CH_2$$

exhibited a 50% control at an application rate of 40 lbs./acre.

EXAMPLE XIII

Substantially equal molar amounts of 5-bromopentanesulfenyl chloride and 1-heptene are reacted at a temperature of about −10° C. following the procedure of Example I. A product composed predominantly of the anti-Markownikov adducts is obtained.

EXAMPLE XIV

Cyclohexanesulfenyl chloride is reacted with 1,5-hexadiene following the general procedure of Example XIII; a large proportion of anti-Markownikov oriented adducts is obtained.

EXAMPLE XV 3-phenylpropanesulfenyl bromide is reacted with 1-methylcyclohexene at a temperature of about −15° C. The reaction conditions and equipment employed are the same as those employed in Example I. After about 2 hours of reaction time, a high proportion of anti-Markownikov adduct is obtained.

EXAMPLE XVI 3-chloropropanesulfenyl chloride and 5-methoxypentene are reacted in the manner described under Example I to yield a major amount of the corresponding anti-Markownikov adduct, i.e., 2-(3-chloropropyl)1-chloro-5-methoxypentyl sulfide.

As noted earlier, the adduct products prepared according to the instant invention possess pesticidal activity and can also be employed as intermediates to pesticidal compositions. The adduct compositions of the present invention, when employed as pesticides, may be employed either in solid or liquid form. Hence, the products may be applied as a powder admixed with inert carrier or may be applied as a spray in a liquid carrier. Typical solid carriers include materials such as clay and talc. Normal liquid carriers include materials such as acetone and ethyl alcohol.

We claim:

1. A process for obtaining an adduct of the formula $$CH_3-S-CH_2-CH-CH=CH_2$$
$$\phantom{CH_3-S-CH_2-}|$$
$$\phantom{CH_3-S-CH_2-}Cl$$

which comprises adding methylsulfenyl chloride to butadiene, in the presence of a hydrogen halide acceptor base and at a temperature ranging from about −100° C. to +100° C.

2. The process of claim 1 wherein the addition is conducted at a temperature below 0° C.

3. The process of claim 1 wherein said base is selected from the group consisting of alkali and alkaline earth metal carbonates and oxides, zinc and cadmium carbonates and oxides, and $C_3$–$C_{12}$ tertiary trihydrocarbyl amines.

4. The process of claim 1 wherein methylsulfenyl chloride and butadiene are brought together in the liquid state.

5. The process of claim 1 wherein the molar ratio of butadiene to methylsulfenyl chloride varies from about 2:1 to 10:1.

6. The compound of the formula $$CH_3-S-CH_2-CH-CH=CH_2$$
$$\phantom{CH_3-S-CH_2-}|$$
$$\phantom{CH_3-S-CH_2-}Cl$$

References Cited

Oswald et al.: "J.A.C.S.," vol. 84 (1962), pp. 3897–3904.

Montanari: "Tetra. Letters," No. 38 (1964), pp. 2685–89.

Babayan: "Chem. Abstracts," vol. 54 (1960), pp. 1368–69.

Hunt et al.: "Chem. Abstracts," vol. 29 (1935), p. 7276.

Kirner: "Chem. Abstracts," vol. 22 (1928), p. 3628.

LEWIS GOTTS, Primary Examiner

D. R. PHILLIPS, Assistant Examiner

U.S. Cl. X.R.

260—609 E; 424—327